United States Patent
Wu

(10) Patent No.: US 8,355,338 B2
(45) Date of Patent: Jan. 15, 2013

(54) METHOD OF PROCESSING SEQUENTIAL INFORMATION IN PACKETS STREAMED OVER A NETWORK

(75) Inventor: Wai Keung Wu, Hong Kong (CN)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 687 days.

(21) Appl. No.: 12/502,900

(22) Filed: Jul. 14, 2009

(65) Prior Publication Data

US 2011/0013618 A1  Jan. 20, 2011

(51) Int. Cl.
*H04L 12/26* (2006.01)
*H04L 12/56* (2006.01)

(52) U.S. Cl. .......................... 370/252; 370/415
(58) Field of Classification Search .................. None
See application file for complete search history.

(56) References Cited

U.S. PATENT DOCUMENTS

| | | | |
|---|---|---|---|
| 5,844,891 A * | 12/1998 | Cox ............................... 370/412 |
| 6,434,606 B1 | 8/2002 | Borella et al. |
| 6,452,950 B1 | 9/2002 | Ohlsson |
| 6,665,317 B1 | 12/2003 | Scott |
| 6,683,889 B1 | 1/2004 | Shaffer et al. |
| 6,684,273 B2 | 1/2004 | Boulandet et al. |
| 6,693,921 B1 | 2/2004 | Whitfield |
| 6,735,192 B1 | 5/2004 | Fried et al. |
| 6,747,999 B1 | 6/2004 | Grosberg et al. |
| 6,859,460 B1 | 2/2005 | Chen |
| 6,862,298 B1 | 3/2005 | Smith et al. |
| 6,952,407 B2 | 10/2005 | Burke |
| 6,977,980 B2 * | 12/2005 | Chang et al. ................. 375/354 |
| 6,985,516 B1 * | 1/2006 | Easton et al. ................. 375/150 |
| 6,996,626 B1 | 2/2006 | Smith |
| 7,006,511 B2 | 2/2006 | Lanzafame et al. |
| 7,027,456 B1 | 4/2006 | Chen |
| 7,110,422 B1 | 9/2006 | Choudhury et al. |
| 7,170,901 B1 | 1/2007 | Katzur |
| 7,263,109 B2 | 8/2007 | Ternovsky |
| 7,359,324 B1 | 4/2008 | Ouellette et al. |
| 7,424,026 B2 | 9/2008 | Mallila |
| 7,443,871 B2 | 10/2008 | Newson et al. |
| 7,450,601 B2 | 11/2008 | Sundqvist et al. |
| 7,453,897 B2 | 11/2008 | Enbom et al. |
| 7,457,282 B2 | 11/2008 | Mallila |
| 2004/0179474 A1 * | 9/2004 | Usuda et al. ................. 370/229 |
| 2005/0175025 A1 * | 8/2005 | Beadle et al. ................ 370/432 |
| 2006/0007960 A1 * | 1/2006 | Liu et al. ...................... 370/503 |
| 2006/0215669 A1 * | 9/2006 | Gangadharan et al. ....... 370/401 |
| 2007/0076764 A1 * | 4/2007 | Kawada et al. ............... 370/503 |
| 2008/0181245 A1 * | 7/2008 | Basso et al. .................. 370/412 |
| 2009/0109988 A1 * | 4/2009 | Musunuri et al. ............. 370/412 |
| 2009/0316712 A1 * | 12/2009 | Shamilian et al. ............ 370/412 |

* cited by examiner

*Primary Examiner* — Gregory Sefcheck
*Assistant Examiner* — Joshua Smith
(74) *Attorney, Agent, or Firm* — Wells St. John, P.S.

(57) ABSTRACT

A method of processing sequential information in near real-time data packets streamed over a network includes providing a process running according to a process clock. The process buffers and decodes the streamed data packets. The speed of the process clock is dynamically controlled in accordance with a receipt time value of a data packet. The speed of the process clock is run faster or slower than a system clock.

20 Claims, 7 Drawing Sheets

METHOD OF PROCESSING SEQUENTIAL INFORMATION IN PACKETS STREAMED OVER A NETWORK

FIELD OF THE INVENTION

The present invention relates to a method of processing sequential information in packets streamed over a network. More particularly, the present invention relates to buffering and decoding of streaming VoIP packets.

BACKGROUND TO THE INVENTION

Packet loss is an important consideration in mobile VoIP communications, in particular, connecting to Wi-Fi network, because as it results in lost voice data. Packet loss concealment (PLC) is used to mask the effects of packet loss in VoIP communications. Packet loss concealment can result from two causes, namely network packet loss (or network loss) caused by packets lost in the network (i.e. packets that are sent but never received at the receiving end) and delayed packet loss (delay loss). A delayed packet is a voice packet that arrives late and causes the receiver to issue a PLC to mask the packet loss. The delay and the variation of delay, also known as jitter, are caused by the packets traveling from the sender to the receiver through intermediate store-and-forward nodes and packet switching networks. Because voice packets must be decoded in strict order of their sequence numbers, a jitter buffer is used at the receiving end to temporarily store arriving packets in order to minimize delay variations. If packets arrive too late then they are discarded. Missing data from discarded packets must be masked using a PLC technique in order to avoid degradation in voice quality. Different voice decoders use different PLC techniques. For example, G.711 uses simple waveform substitution while G.729 uses more sophisticated algorithms.

In general, there is a tradeoff between the number of delayed packets and the buffering playout time. A long buffering time means that the voice packets will be decoded and playout later in order to absorb the jitter, but with longer latency. A short buffering time means that the voice packets will be decoded earlier in order to minimize the latency, but with a large number of delayed packets. In VoIP, particularly voice over WLAN (VoWLAN), latency is more noticeable because a large portion of latency is the single trip time from the sender to the receiver. If voice latency is too large, for example over 300 ms, voice conversation becomes hard due to double talk. For example, the single trip time of a data packet transmitted over the internet between, say, Asia and North America might range from 100 to 160 ms. In addition the single trip time for a packet between the VoIP client and network access point over a Wi-Fi network may range from 5 to 40 ms. The total trip time latency between two VoIP clients, one in Asia and one in the USA, therefore may be between (100+5)=105 ms and (160+40)=200 ms, excluding packetization delay, decoding delay and processing overheads. Consider the situation when the first packet takes the best-case time of 105 ms to travel from the sending end to the receiving end. The next packet in the sequence takes 190 ms and the third packet in the sequence takes the best case time of 105 ms. Suppose the buffering time is 70 ms. In order for packets to be processed within the buffering time the second packet must be discarded and masked by a PLC. A single PLC is acceptable in order to trade off a shorter voice latency because single PLC on voice is usually unnoticeable by the listener. However consecutive PLCs degrade voice quality and should be avoided.

Various techniques have been proposed for calculating or estimating jitter buffer size as a trade off between delayed packet loss and voice latency. Some techniques use buffer size only; for example, if the buffer is underflow, it increases the buffer size. If it is overflow, it decreases the size by dropping some voice samples. Other techniques involve considering the number of delayed packets that the receiver encounters. If the total amount exceeds a certain pre-determined threshold value, the buffer size is increased. However, this causes consecutive PLCs and in turn severely deteriorates the voice quality. Yet further techniques use jitter estimate functions to calculate the desired buffer size, e.g. arrival packet jitter characteristic.

SUMMARY OF THE INVENTION

The present invention to ameliorate the above problem by providing an adaptive method of adjusting the buffering time of encoded VoIP packets that tries to maximizes voice quality by minimizing the latency and the number of packet loss concealments (PLC), particularly consecutive PLCs, during decoding by considering the number of delayed packets, network loss rate, jitter and jitter variance; or that adapts the arrival rate of voice packet, either over-sampled or under-sampled due to the asynchronous clocks of the senders and receivers; or that is able to run on general purpose OS/RTOS/embedded OS; or at least provide the art with a useful alternative.

More particularly the invention relates to a jitter buffering method that determines the time to decode the packets and adjusts the buffering time to absorb the delay in order to avoid consecutive PLC, according to network statistic such as occurrences of delayed packets, network loss and jitter variation.

In a first particular aspect the invention provides a method of processing sequential information in real-time data packets streamed over a network, comprising providing a process running according to a process clock, the process buffering and decoding streamed data packets, and dynamically controlling the speed of the process clock in accordance with a receipt time value of a data packet. Dynamically controlling the speed of the process clock comprises running the process clock faster or slower than a system clock.

Further aspects of the invention will become apparent from the following description of exemplary embodiments of the invention, which are given by way of example only.

BRIEF DESCRIPTION OF THE DRAWINGS

An exemplary form of the present invention will now be described by way of example only and with reference to the accompanying drawings, in which.

DESCRIPTION OF THE PREFERRED EMBODIMENTS

Figure 1:
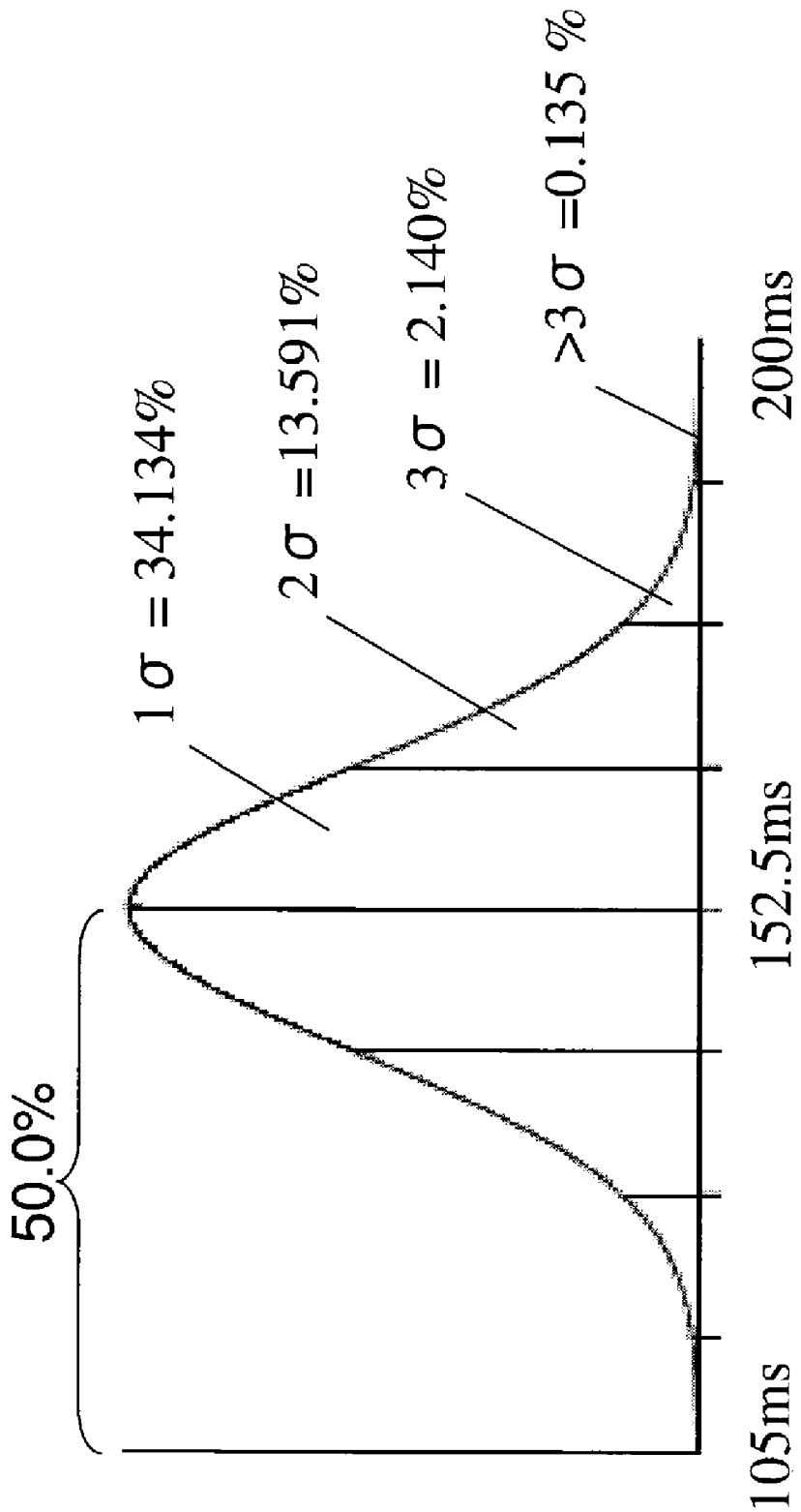
FIG. 1 illustrates a normal or Gaussian distribution curve of packet arrival or trip times in a network.

Before any embodiments of the invention are explained in detail, it is to be understood that the invention is not limited in its application to the details of arrangements set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

The present invention relates to the receipt and playout of voice packets that have been encoded in RTP packets and transmitted through an IP network such as, but not limited to, 802.11 WLAN, 802.3 Ethernet, 802.16 WiMAX, GPRS or Dial-up. The invention is preferably, although not exclusively, used in a network enabled device having VoIP or other near real-time voice streaming data communication applications. Such applications may be implemented as a third party DLLs, applications or software modules installed and run on the device for receiving a playing out streaming audio data. In the preferred embodiment the DLL, application or software module is programmed as separate threads (e.g. multi-threading) running on a single processor. The skilled addressee will appreciate that the invention could be implemented as a single thread or multi processes, or in a DSP or a field programmable gate array (FPGA).

The following concepts, abbreviations and definitions are helpful in understanding the invention and may be used in the description to help illustrate and explain the invention. They are not intended to limit the scope of use or functionality of the invention.

Packet timestamp: is the timestamp applied to the packet at the sending end.

Packet arrival time: is the wall clock W time unit at which a packet arrives at the receiving end. When a voice packet arrives at the receiver, it marks the packet with the arrival time.

Packet jitter: is the packet timestamp minus packet arrival time. For the purpose of initially synchronizing the sending and receiving end clocks, the wall clock W is initially set to the timestamp of the first packet in a stream so that the first packet has a packet jitter of zero. If the packet jitter of a subsequent packet is positive, it means that the packet has arrived earlier than its playout time. If packet jitter is negative, the packet has arrived late. A late packet will be discarded because the decoder must decode the packet payload in strict ascending order of sequence numbers.

Delayed packet loss: when a RTP packet arrives late the receiver issues a PLC to the decoder to generate voice data to mask the missing packet payload. Note that this invention can adjust the delayed packet loss rate by adjusting the buffering time of the encoded packet at the receiver.

Network loss: RTP packets lost in the network path. Network loss also causes the receiver issues PLC to the decoder. Note that this invention cannot improve the network loss rate, which is usually solved by other rate control methods.

$D_i$: the buffering time of encoded packet at the receiver side at the ith iteration. By definition, $D_i$=Max(packet timestamp−packet arrival time, 0). $D_i$>0 means that packet arrives early. If packet arrival time is less than packet timestamp (i.e. $D_i$=0), it means it arrives late and this packet should be discarded.

$B_i$: the moving average of $D_i$ over K iterations, where K>0. If $B_i$ is increasing it means the overall jitter delay is increasing and packets will accumulate in the RTP Buffer 11 gradually, eventually increasing voice latency. If $B_i$ is decreasing it means the overall latency is decreasing.

$J_i$: packet jitter (i.e. packet timestamp−packet arrival time) at the ith iteration. $J_i$>0 means that packet arrives early while $J_i$<0 means that packet arrives late. It should be noted that $J_i$ is different from the inter-arrival jitter described in RFC 3550 (RTP).

$J_\sigma$: the standard deviation of $J_i$ over the last K iterations, where K>0. $J_\sigma$ is used to statistically determine the chance of having delayed packet loss.

$L_{rtp}$: The network loss rate over K iterations, where K>0. For example, if there are 5 network losses over 100 packets, the network loss rate is 5%.

$W_i$: Wall clock time at ith iteration.

For the purpose of illustration, those skilled in the art will know that time can be expressed in either time unit (e.g. second or milliseconds) or timestamp unit. Second or millisecond is an absolute measurement of time while a timestamp unit is relative to the sampling rate. For example, if the audio is sampling at a rate of 8 kHz, 1 timestamp unit represents 1/8000 second (0.125 millisecond). In general, if the sampling frequency is f, one timestamp unit is 1/f second. Timestamp unit is widely used in the Real-time Transport Protocol (RTP) and implementation of RTP media stack and real time data processing because it can be represented by a 32-bit unsigned integer variable which can be handled efficiently in most computing devices. For instance, suppose the current wall clock time is 12000 and the newly arrival packet has a timestamp value of 12560. The packet jitter (i.e. packet timestamp−packet arrival time) is 12560−12000=560. This means that the packet arrived early because its jitter value is positive. For the sake of simplicity of illustration, the term "timestamp unit" and "time unit" are synonymous in this text.

In one aspect the current invention minimizes the latency and the number of consecutive packet loss concealments by dynamically adjusting the rate of decoding received packets based on a probability distribution that describes the probability that a next packet will be a late packet. FIG. 1 illustrates a normal or Gaussian distribution curve of packet arrival or trip times in a network. Empirical analysis, which can be readily verified by the skilled addressee, shows that the arrival or trip time of packets streamed across a network fits a normal or Gaussian distribution approximately. In FIG. 1 the minimum total trip time latency between two VoIP clients is 105 ms and the maximum is 200 ms. The trip time of all packets fits within the normal distribution curve with most packets clustered around a mean of 152.5 ms. Using standard deviation and confidence intervals one can predict that about 84.134% (i.e. 50%+34.134%) of packets have a trip time of within one standard deviation σ away from the mean, about 97.725% have a trip time of within two standard deviations and about 99.87% have a trip time of within three standard deviations of the mean. In a continuous system like streaming voice packets the shape of the normal distribution curve, and thus the standard deviation or confidence intervals, change continuously. By continuously calculating the moving average B of the buffering time and the standard deviation of the packet jitter J cumulative normal distribution function we can predict the likelihood that the next packet will be a late packet. Moreover, if we can accept the loss of the 2.3% of packets having the longest packet jitter J then by controlling the decoding rate of received packets, we can minimize latency while having 97.725% confidence that the next packet will not be late.

Figure 2:
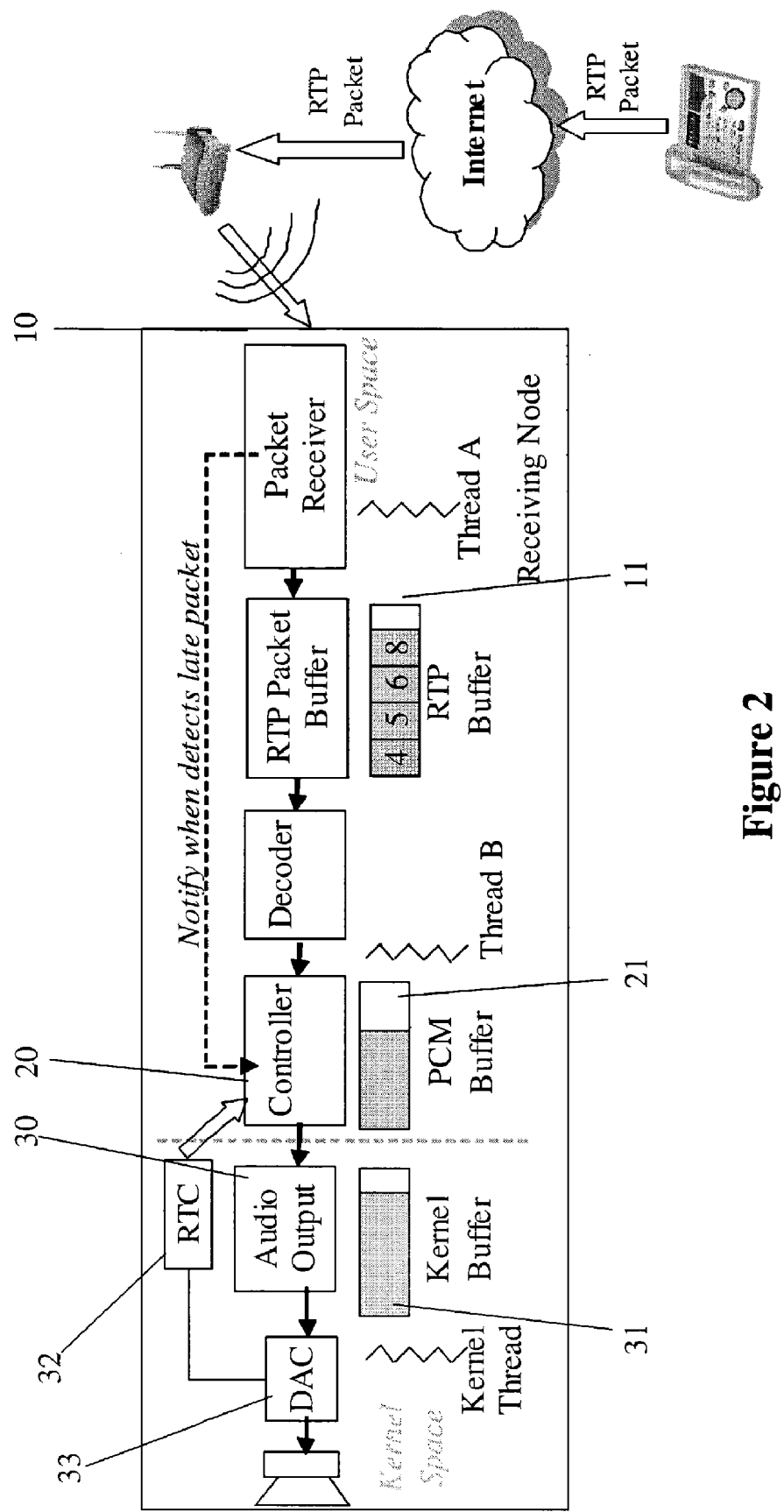
FIG. 2 is a schematic illustration of workflow of decoding the RTP packet and playout of PCM samples.

Referring to FIG. 2, in a preferred embodiment of the invention, receipt and play out of a streaming VoIP audio signal at a receiving end comprises three processes 10, 20, 30 each controlled by a separate processing thread and having its own buffer. The first process 10, packet receiver, is responsible for the receipt of RTP packets from the network and buffering them in a RTP Buffer 11. The packet receiver 10 is running on a processing thread, Thread A. The second process 20, controller, is responsible for controlling when to decode RTP packets and the subsequent buffering of decoded data in the form of pulse code modulation (PCM) into a PCM Buffer 21. If required, the controller 20 also adds, drops or modifies samples in the PCM Buffer 21 before it puts the PCM data into Kernel Buffer 31 in order to prevent kernel audio buffer overflow or underflow. A second processing thread, Thread B, is the thread of control for the process 20. The third process 30, controlled by a Kernel Thread, puts PCM data from the Kernel Buffer 31 into a digital analog converter (DAC) 33 and reconstructs the analog signal for playout. In the preferred embodiment Thread A and Thread B run in user space and the Kernel Thread runs in kernel space, although this is not required by the invention. Those skilled in the art will recognize that the invention can be implemented by either a single thread or multithreads or multi processes, or in either kernel space or user space or both, either using high level programming language or assembly or FPGA or custom made IC.

The invention controls the wall clock $W_i$ shared by both processes 10 and 20. The controller 20, which runs on Thread B, controls the timing of wall clock $W_i$. The controller 20 determines when and how many packets to decode the encoded RTP payload into the PCM Buffer 21. Speeding up the decoding of packets decreases the latency $D_i$ while slowing it down increases the latency $D_i$.

Figure 3:
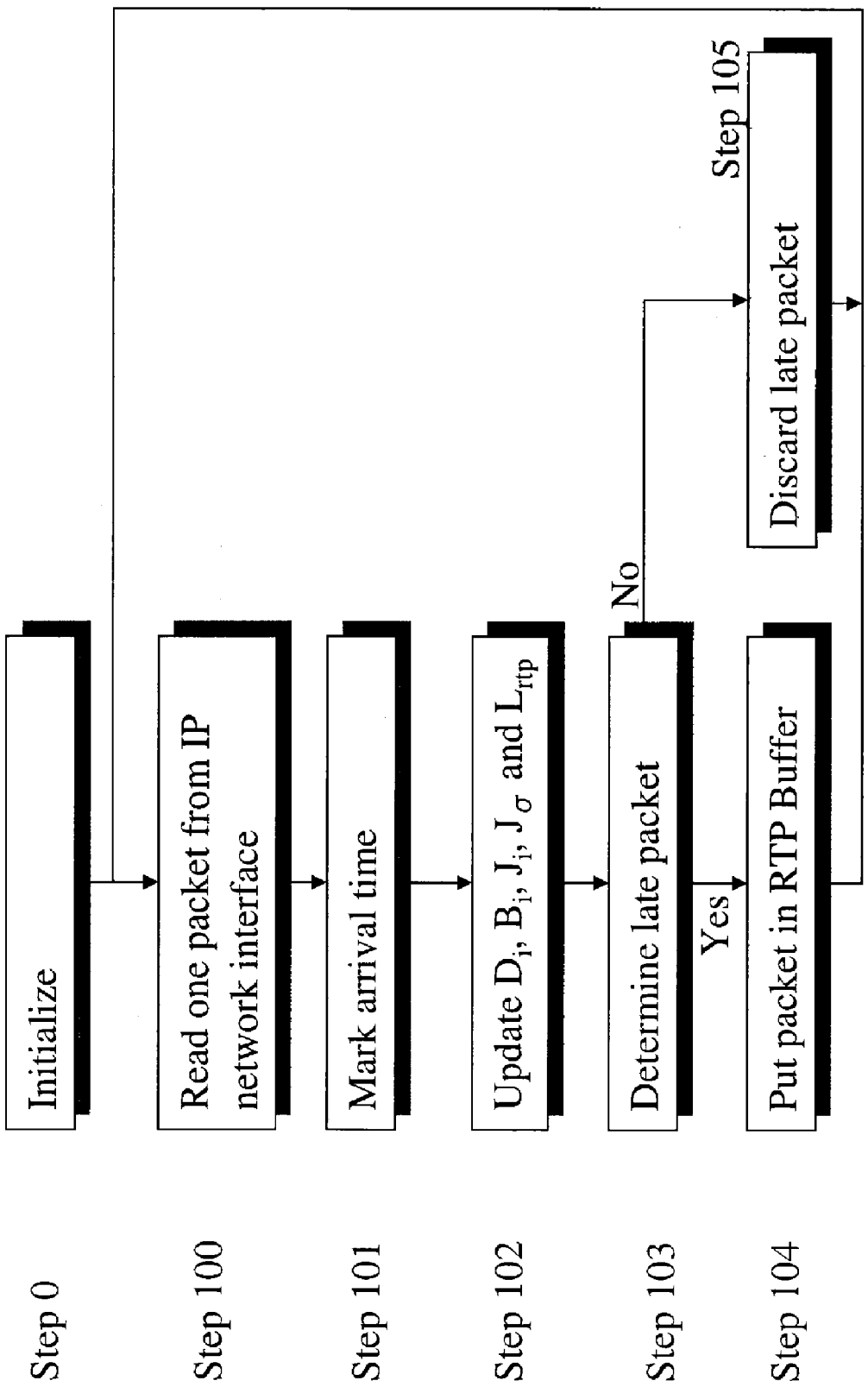
FIG. 3 is a schematic illustration of workflow of a packet receiver running on first processing thread for buffering RTP packets.

Referring to FIG. 3, the packet receiver 10 running on Thread A is a loop that handles receipt and buffering in the RTP Buffer 11 of RTP packets received from the network after it is initialized in step 0. When a RTP packet is received at the network interface port (step 100) the packet receiver 10 marks the arrival time of the packet (step 101) and determines new values of $D_i$, $B_i$, $J_i$, $J_o$, and $L_{rtp}$ (step 102). The packet is then inserted into the RTP Buffer 11 in strict ascending order of RTP packet sequence number. The current invention envisages that packets may be received out of order and therefore the RTP Buffer 11 is not strictly a first in first out buffer. The packet receiver 10 may insert a packet at a position in the RTP buffer 11 in order to maintain the correct ascending order of sequence numbers. The packet receiver 10 must first determine whether the received packet is late (step 103). If a packet is late it is discarded and the packet receiver 10 on Thread A sets a flag that is read by the controller 20 on Thread B about the occurrence of late packet (step 105). If a packet is not late it is buffered in the RTP Buffer 11 in ascending order of RTP packet sequence numbers (step 104). The invention can slow down or speed up the rate of decoding of buffered packets by the controller 20, in order to ameliorate the number of packets discarded for being late. It performs this by controlling the clock time $W_i$ shared by both the controller 20 in Thread B and packet receiver 10 in Thread A. By slowing down $W_i$ more time is provided for late packets to arrive before its playout time. When there is no packet on the socket, Thread A just waits on that network port.

Figure 4:
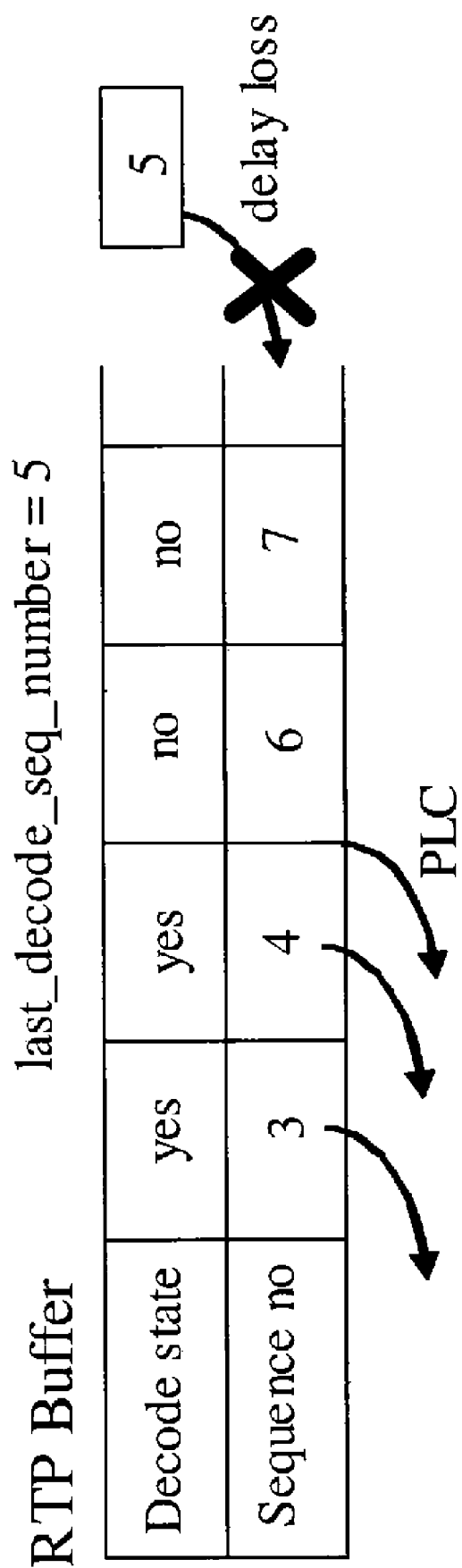
FIG. 4 is a schematic illustration of delayed packet loss.

FIG. 4 illustrates a late packet. When the controller 20 decodes a packet from the RTP Buffer 11 it updates the last decoded packet sequence number in a variable, say, last_decode_seq_number. The packet receiver 10 can detect a late packet by comparing the sequence numbers of a newly arrived packet with the packet number in the last decoded packet counter. If the last decoded packet sequence number is greater than or equal to the sequence number of the newly arrival packet, the packet receiver 10 sets the delayed packet flag to notify the controller 20 that a late packet is detected. The controller 20 can detect a missing packet by comparing sequence numbers but does not know whether it is due to a network loss or delayed packet loss. Therefore the controller 20 needs notification from the packet receiver 10 because the packet receiver will discard late packet. In FIG. 4 packet 5 is late because packet 5 has been masked by PLC.

Figure 5:
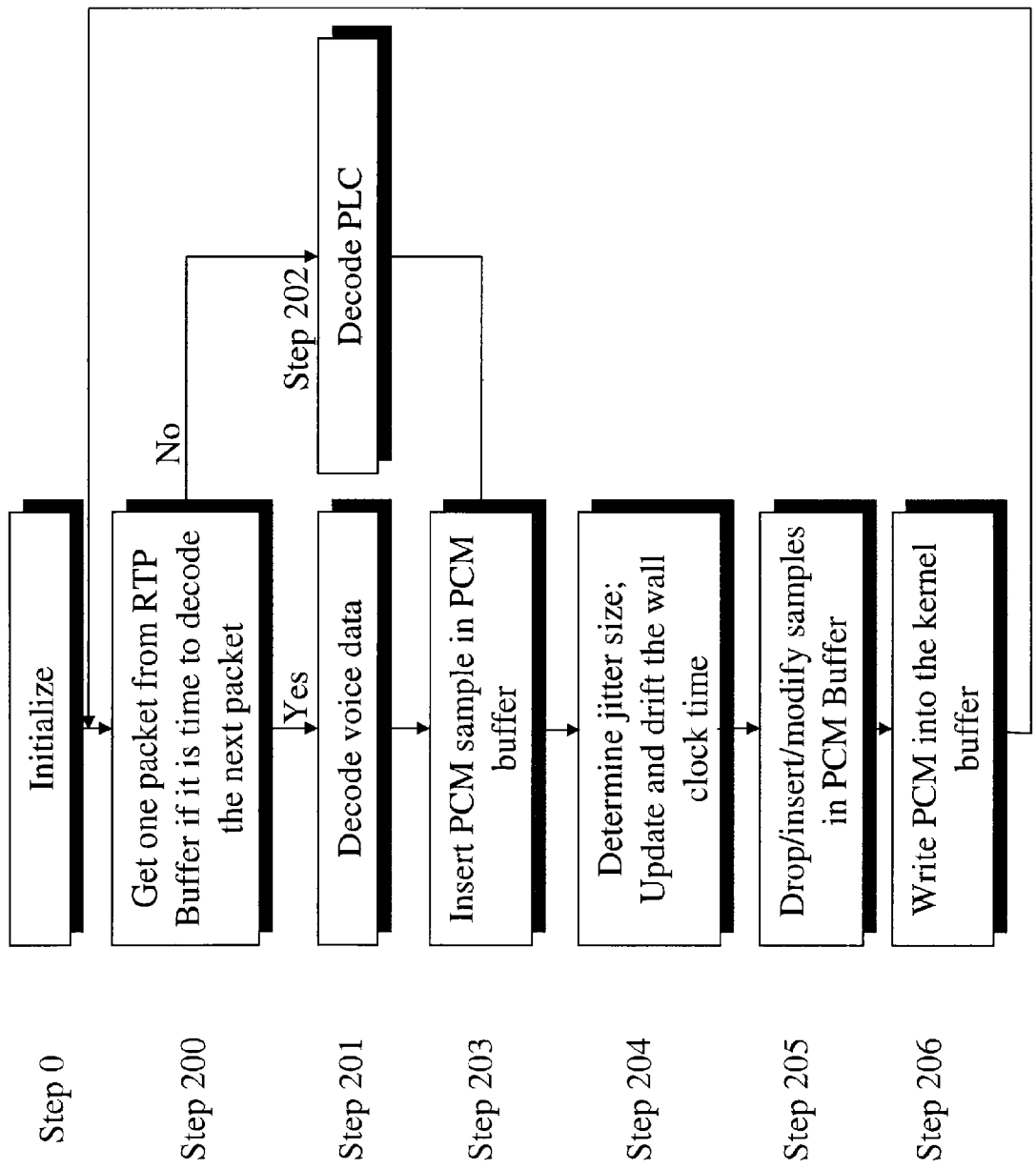
FIG. 5 is a schematic illustration of the workflow of a controller running on second processing thread for decoding buffered RTP packets and determining buffering size.

The controller 20 on Thread B reads the RTP payload from packets in the RTP packet buffer 11 in sequential order and then decodes the payload according to the payload type. The decoded audio is put in to PCM Buffer 21. The controller 20 is also responsible for putting PCM data into the Kernel buffer 31 in kernel driver. It determines when and how many PCM samples to be put in the Kernel Buffer 31 and to be played-out. The controller 20 controls the timing of a wall clock $W_i$ that is used for determining when it is time to decode the next packet in the RTP buffer 11. The wall clock $W_i$ determines whether a packet is late. Referring to FIG. 5, the initial value of wall clock $W_0$ is set to the timestamp of the first sample of the RTP packets stored in RTP Buffer 11 during the initialization (step 0). When it is time to get the next packet from the RTP Buffer 11 the controller 20 determines whether the next packet in the buffer is the next in the sequence (step 200). It achieves this by maintaining the sequence number of the last decoded packet (last_decode_seq_number). If the packet is not the next in the sequence then the packet must be lost in the network or late and hence the controller 20 decodes a PLC to replace the missing PCM data (step 202). If the sequential packet is available then the controller 20 decodes the encoded voice payload (step 201). It then inserts the PCM audio data into the end of the PCM Buffer 21 (step 203). In step 204, it checks the delayed packet loss flag to determine whether the previous missing packet is a delayed packet or a network loss packet. If the flag is set to true, it is a delayed packet. Otherwise it is a network loss. It then uses statistical values and occurrences of delayed packets to determine if it needs to drift the wall clock $W_i$ forward or backward, which in turn controls the latency of incoming packets to avoid consecutive PLCs due to delayed packet loss. The controller 20 may insert, drop or modify PCM samples in the PCM Buffer 21 to prevent under flow or over flow of kernel buffer 31 (step 205). Then it writes data from the beginning of the PCM Buffer 21 into the Kernel Buffer 31 (step 206) for playout by the Kernel Thread.

The following discussion relates to adjustment of buffering latency $D_i$ and wall clock time drifting. In the VoIP world, the clocks of peers are not synchronized. Hence, the arrival rate of voice packet arrival from the sender may not match exactly what is described in the service description e.g. SDP. If voice packets are played faster than they are received from networks then the buffering time decreases until eventually there is no packets in the buffer which causes voice interruption. On the other hand, when sound packets are played slower than they are received from the network, the buffering time (voice latency) increases. In the invention playing time is adjusted dynamically (adaptively) in an attempt to meet the following objectives:

to avoid consecutive PLCs by increasing buffering time faster once delayed packet loss is detected or estimated (which is done statistically using $J_o$ and $L_{rtp}$), to minimize the buffering time if no delayed packet is found or estimated,
to provide a "cushion" to prevent packet delay.

The value of $W_i$ is being updated by the controller 20 (step 204) according to the system real time clock (RTC) 32 in each iteration. There are two parts of updates: normal update and drifting update. Normal update means $W_i$ is updated based on the system RTC 32. Suppose the sampling rate is f Hz and the period of iteration is T ms. The controller 20 updates the wall clock by the following equation (suppose no drifting):

$$W_{i+1} = W_i + T/1000 * f$$

In accordance with the current invention the wall clock used by the controller 20 on Thread B and packet receiver 10 on Thread A is adjusted by drifting it forward or backward in order to avoid late packets and to control when to decode and play out the packets. The drifting can be either forward or backward. For example, if the clock time $W_i$ is equal to packet timestamp, the controller 20 decodes the packet and puts the decoded PCM data into PCM Buffer 21 and then the Kernel Buffer 31 for playing. This in turn affects the buffing delay $D_i$. If the clock is drifted forward the incoming packets will be played earlier. If the clock is drifted backward the incoming packets will be played later. It is desirable to let the wall clock $W_i$ run faster if the sender is over sampling the voice and/or the number of late packets is small, in which case the buffering latency $D_i$ will decrease gradually. Drifting forward will minimize average delay. It should be noted that time drifting should be done evenly over a large number of samples. The controller 20 maintains the average drifting rate and is responsible for calculating how many samples it needs to skip and hence how long $W_i$ needs to be advanced. For instance, the controller 20 decides to let the $W_i$ run faster by N samples. It needs to decreases N samples in the PCM Buffer 21 before writing to the kernel by removing or dropping some samples from the PCM Buffer 21 (step 204). A suitable scaling method known in the art can be used to decrease the size of the PCM Buffer 21. After scaling, the controller 20 increases $W_i$ by N. Hence, when the controller 20 calculates $W_i$ in the next execution loop it will be advanced by N.

Similarly, it is desirable to let the wall clock $W_i$ run slower if the sender is under sampling the voice and/or the number of late packets is large, in which case the buffer latency is increasing gradually. Drifting backward will increase the average delay. The controller 20 is responsible to detect how many samples it needs to add and how long $W_i$ need to drift backward by decreasing value of wall clock $W_i$. For instance, the controller 20 decides to let the $W_i$ run slower by N samples, it needs to add N samples in the PCM Buffer 21 before writing to the kernel. Samples can be added to the PCM Buffer 21 by other scaling methods known in the art. After scaling, the controller 20 decreases $W_i$ by N samples. Hence, when the controller 20 calculates $W_i$ in the next execution loop it will be drifted backward by N.

Therefore the overall equation to update the wall clock is $$W_{i+1} = W_i + T/1000 * f + N \qquad (1)$$

where N is positive for drifting forward, N is negative for drifting backward or N is zero for no drifting.

In the preferred embodiment of the invention there are four time drifting modes. The first mode is 'no drifting', which is also the starting state. The second mode is 'slow drifting forward' in which the wall clock is advanced relatively slowly until stopping criteria is met. Empirically, drifting 2 samples over 160 samples (0.25 ms over 20 ms) is considered to be slow drifting. The third mode is 'fast drifting forward' in which the wall clock is aggressively advanced until stopping criteria is met. Empirically, drifting 7 samples over 160 samples (0.875 ms over 20 ms) is considered to be aggressive. It should be noted that the drifting rate is configurable and those skilled in the art will appreciate that aspects of the invention may be practiced with other configurable values, for example 3 samples over 160 samples for slow drifting and 10 samples over 160 samples for fast drifting. However the rate of drifting in fast drifting mode, either forward or backward, should not affect the voice quality. The fourth mode is 'drifting backward' in which the wall clock is aggressively drifted backward. The drifting rate is the same as the third mode.

The transitions among different modes are determined by the RTP packet statistics and occurrences of delayed packets. There are four conditions that trigger transitions. Condition A and Condition B require the occurrence of delayed packet.

Figure 6:
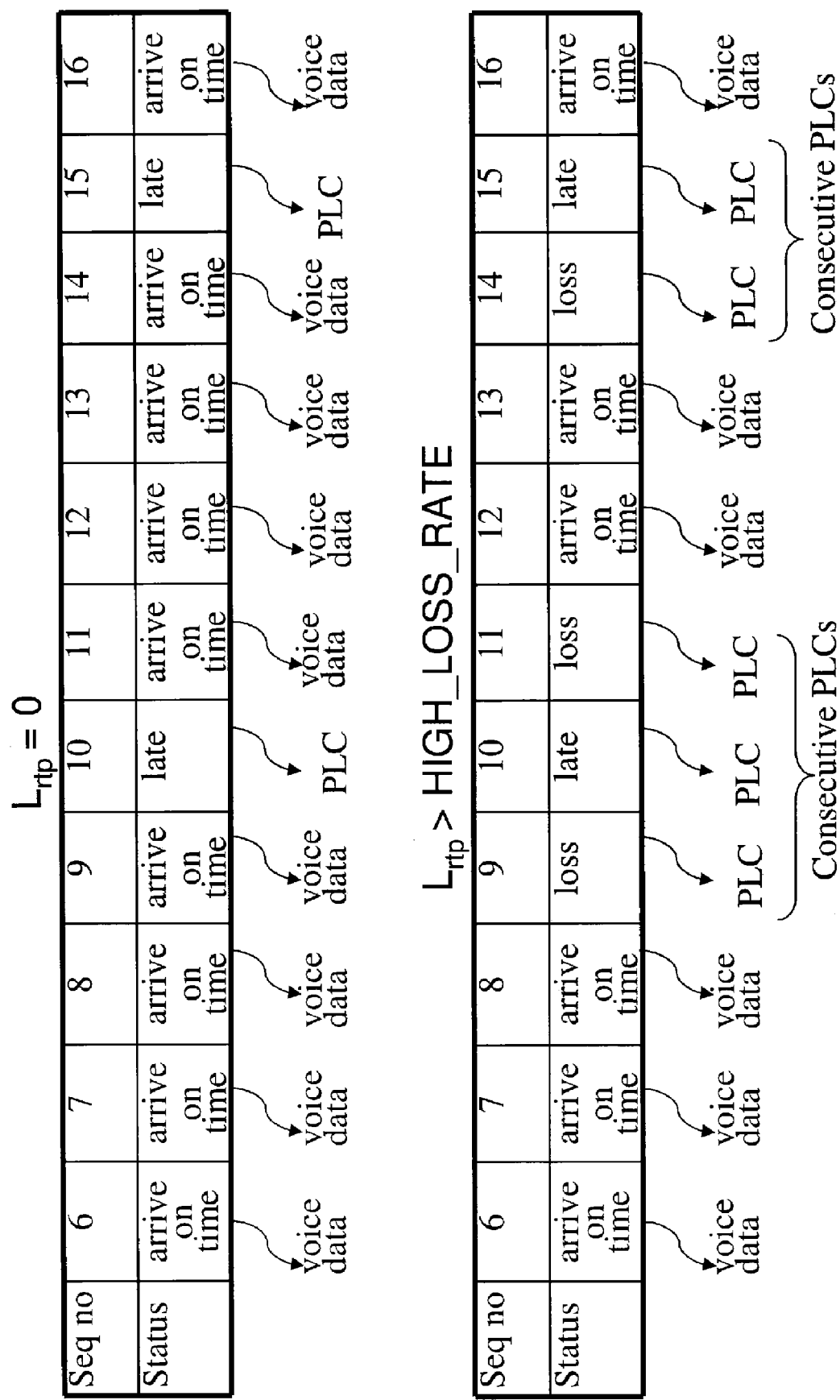
FIG. 6 is a schematic illustration of the occurrences of consecutive PLCs in a high network packet loss environment with delayed packets.

Condition A: When there is a delayed packet detected by the packet receiver 10 and either $B_i < 2\ J_o$ or $L_{rtp} >$ HIGH_LOSS_RATE, the controller 20 should start to drift the wall clock $W_i$ backward. The reason is that if the average latency $B_i$ is close to the 2 standard deviation, we can expect the further forward drifting will greatly increase the number of delayed packet losses. It should be noted that $2\ J_o$ is chosen because only 2.3% of packet will exceed the buffering time under normal distribution based on the assumption that the packet arrival distribution is close to normal distribution. Moreover, if the packet loss rate $L_{rtp}$ is higher than the threshold value HIGH_LOSS_RATE, the chance of consecutive PLCs will be higher and in turn the voice quality is deteriorated because both network loss and delayed packet loss will trigger more consecutive PLCs which will be illustrated in FIG. 6. Referring to FIG. 6, packet 10 and 15 are late. The upper and lower tables shows the arrival of packets with the same packet arrival times except packet 9, 11 and 14 are lost in the network in the lower table. The upper table of FIG. 6 shows that there is no consecutive PLCs when $L_{rtp} = 0$ while the lower part shows that there are consecutive PLCs when $L_{rtp} >$ HIGH_LOSS_RATE. In the preferred embodiment the value of the HIGH_LOSS_RATE is network loss rate of 3-6%. The packet loss rate $L_{rtp}$ which is greater than 3% to 6% is common in WLAN network for connectionless real-time transport (e.g. UDP), particularly in public WiFi hotspot. Hence the controller 20 should stop drifting wall clock forward to avoid consecutive PLCs in a high network loss environment.

Condition B: When there is a delayed packet detected by the packet receiver 10 and $B_i \geq 2\ J_o$ and $L_{rtp}$ is lower than the threshold value HIGH_LOSS_RATE, the controller 20 stops fast forward drifting and turns on slow forward drifting. As mentioned before, the main focus of this invention is to minimize the latency by avoiding consecutive PLCs. If the average latency $B_i$ is close to the 2 standard deviation and $L_{rtp}$ is low, the controller 20 wants to drift $W_i$ forward at a slow rate in order to further minimize the buffer latency.

Condition C: When $B_i \leq 1.5\ J_o$, condition C is triggered. This condition happens when the buffering delay is lower than 1.5 standard deviations of the packet jitter.

Condition D: When $B_i > 3\ J_o$, condition D is triggered. This condition happens when the buffering delay is very large and hence the chance of having a late packet is very low. When several conditions happens at the same time, the precedence is condition A, condition B, condition C and condition D.

Figure 7:
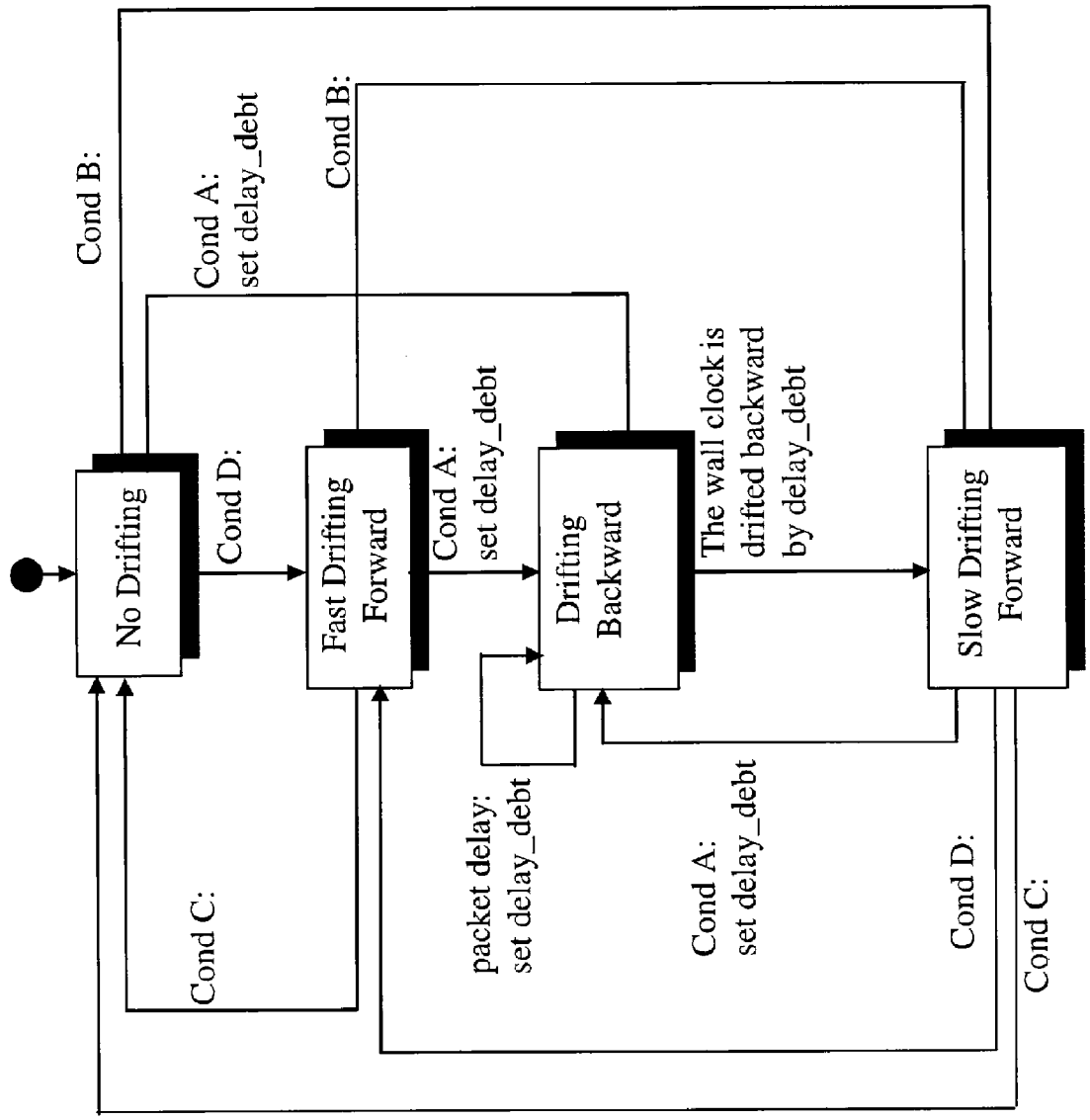
FIG. 7 is a flow diagram of wall clock drifting modes and transitions.

The drifting modes, the transitions between different drifting modes and the stopping criteria are illustrated in FIG. 7. The initial mode is 'no drifting'. The controller 20 on Thread B processes packets according to $W_i$ and drifts the value of $W_i$ according to the following criteria.

"No Drifting" State

In the no drifting state, as described before, there is no drifting in updating of $W_i$ in each iteration (N=0 in equation (1)).

1. If condition A happens, go to "Drifting Backward" state. The value of delay_debt is the duration of delay (e.g. arrival timestamp minus the packet time stamp) of the delayed packet that triggered condition A. The usage of delay_debt will be described later.

2. If condition B happens, go to "Slow Drifting Forward" state.

3. If condition D happens, go to "Fast Drifting Forward" state. It is because average buffering delay $B_i$ is increasing and the controller 20 should go to "Fast Drifting Forward" state to minimize the latency. Otherwise the RTP packets are accumulating in the RTP Buffer 11.

"Fast Drifting Forward" State

In this state, the time is updated with forward drifting by the controller 20 (set N to positive in equation (1)).

1. If condition A happens, go to "Drifting Backward" state. The value of delay_debt is the duration of delay (e.g. arrival timestamp minus the packet time stamp) of the delayed packet that triggered condition A.

2. If condition B happens, go to "Slow Drifting Forward" state. The main purpose is to drift the wall clock at a slow rate in order to further minimize the buffering latency.

3. If condition C happens, go to "No Drifting" state. This main purpose is to stop drifting forward because the buffering time is comparatively small.

"Drifting Backward" State

In this state, the time is updated with backward drifting by the controller 20 (set N to negative in equation (1)).

1. The delay debt is the number of samples that the wall clock needs to drift backwards in order to avoid further delay losses. Delay debt is calculated by the formula: delay_debt=arrival timestamp−timestamp of last delayed packet. The delay debt is recalculated at each iteration during this state. It should be noted that it may take several iterations in this state because each iteration may drift only a few samples (e.g. drifting 7 samples over 160 samples) to avoid degradation of voice quality. When the value of the wall clock $W_i$ has been drifted back by "delay_debt" number of samples, the system enters "Slow Drifting Forward" state. If there is another delayed packet notified by packet receiver 10 in the "Drifting Backward" state, the delay debt is updated by the new value of delay_debt if the new delay_debt is greater than the current delay_debt.

"Slow Drifting Forward" State

In this state, the time is updated with forward drifting at a slow rate by the controller 20 (set N to positive in equation (1)).

1. If condition A happens, go to "Drifting Backward" state. The value of delay_debt is the duration of delay of the delayed packet.

2. If condition C happens, go to "No Drifting" state. If condition C happens, go to "No Drifting" state. This main purpose is to stop forward drifting because the buffering time is very small.

3. If condition D happens, go to "Fast Drifting Forward" state. It is because average buffering delay $B_i$ is large and the controller 20 should start to minimize the latency. Otherwise the RTP packets are accumulating in the RTP Buffer 11.

Exemplary embodiments of the invention have been described. These are not intended to limit the scope of use or functionality of the invention. It should be appreciated that modifications and alternations obvious to those skilled in the art are not to be considered as beyond the scope of the present invention.

The invention claimed is:

1. A method of processing sequential information in near real-time data packets streamed over a network, comprising:
   providing a process running according to a process clock, the process buffering and decoding streamed data packets, and
   dynamically controlling the speed of the process clock in accordance with a receipt time value of a data packet, wherein the controlling further comprising:
   calculating a jitter value based on the receipt time of the data packet, and wherein if the jitter value falls on a first side of a threshold running the process clock faster than the system clock, and if the jitter value falls on a second side of the threshold running the process clock slower than the system clock; wherein running the process clock faster or slower than the system clock further comprising the steps of updating the process clock according to the equation of:

$$W_{i+1} = W_i + T/1000 * f + N$$

where $W_{i+1}$ is a process clock time at i+1th iteration; $W_i$ is a process clock time at ith iteration; T is a period of iteration; f is a sampling rate; and N is a drifting rate; wherein N being positive for drifting forward, N being negative for drifting backward and N being zero for no drifting.

2. The method of claim 1 wherein the data packet has a time stamp value, and calculating the jitter value comprises subtracting the receipt time value from the time stamp value.

3. The method of claim 2 wherein the threshold is zero such that the jitter value is on the first side of the threshold if the time stamp value is greater than the receipt time value, and on the second side of the threshold if the receipt time value is greater than the time stamp value.

4. The method of claim 1 further comprising calculating a plurality of jitter values for a corresponding plurality of received data packets, calculating a moving average B of the plurality of jitter values, calculating a confidence value a of the plurality of jitter values, and:
   running the process clock slower than the system clock if $B<2\sigma$
   running the process clock faster than the system clock if $B>2\sigma$.

5. The method of claim 4 wherein the data packet has a time stamp value and further comprising only running the process clock faster than the system clock if respectively $B>2\sigma$ and the time stamp value is greater than the receipt time value.

6. The method of claim 4 further comprising running the process clock at a same speed as the system clock if $B<1.5\sigma$.

7. The method of claim 4 further comprising running the process clock at a first speed if $B>2\sigma$ and running the process clock at a second speed if $B>3\sigma$, wherein the second speed is faster than the first speed and the first speed is faster than the system clock.

8. The method of claim 4 wherein running the process clock slower or faster than the systems clock occurs if a delayed packet has first been detected.

9. The method of claim 4 wherein the data packet has a time stamp value and running the process clock slower than the system clock continues until the receipt time value is equal-or-less than ($\leq$) the time stamp value.

10. The method of claim 1 further comprising calculating a loss rate of a plurality of received data packets, and running the process clock slower than the system clock if the network loss rate is greater than a network loss threshold.

11. The method of claim 1 further comprising calculating a loss rate of a plurality of received data packets, and running the process clock faster than the system clock if the network loss rate is less than a network loss threshold.

12. The method of claim 11 wherein the network loss threshold is 3%.

13. The method of claim 1 further comprising calculating a packet delay value, and running the process clock slower than the system clock for the packet delay value, or until the packet delay value is equal-or-greater than ($\geqq$) zero.

14. The method of claim 13 wherein each data packet has a time stamp value and a receipt time value and wherein the packet delay value is equal to the receipt time value less the timestamp value.

15. The method of claim 1 wherein the speed of the process clock is dynamically controlled in accordance with an average streaming time of the two or more packets.

16. The method of claim 1 wherein buffering comprises storing incoming packets in a first buffer and the method further comprises dynamically controlling length of the first buffer together with the speed of the process clock.

17. The method of claim 1 wherein dynamically controlling the speed of the process clock in accordance with receipt time of two or more packets, comprises determining a statistical probability that a packet will have a received time that is later than a time at which it was to be decoded.

18. The method of claim 17 wherein if the statistical probability that a packet will have a received time that is later than a time at which it was to be decoded is low then speeding up the process clock, or if the statistical probability that a packet will have a received time that is later than a time at which it was to be decoded is high then slowing down the process clock.

19. A method of processing sequential information in data packets streamed over a network, comprising providing a process running according to a process clock, the process buffering and decoding streamed data packets, calculating a plurality of jitter values for a corresponding plurality of received data packets, calculating a moving average B of the plurality of jitter values, calculating a standard deviation a of the plurality of jitter values, and:
running the process clock slower than the system clock if $B<2\sigma$; running the process clock at a first speed faster than the system clock if $B>1.5\sigma$;
running the process clock at a second speed faster than the system clock if $B>2\sigma$; and
otherwise running the process clock at a same speed as the system clock; wherein the second speed is faster than the first speed.

20. A method of processing sequential information in near real-time data packets streamed over a network, comprising:
providing a process running according to a process clock, the process buffering and decoding streamed data packets;
dynamically controlling the speed of the process clock in accordance with a receipt time value of a data packet;
calculating a plurality of jitter values for a corresponding plurality of received data packets;
calculating a moving average B of the plurality of jitter values;
calculating a confidence value $\sigma$ of the plurality of jitter values;
running the process clock slower than the system clock if $B<2\sigma$;
running the process clock at a first speed which is faster than the system clock if $B>2\sigma$;
running the process clock at a second speed if $B>3\sigma$; and
wherein the second speed is faster than the first speed and the first speed is faster than the system clock.

* * * * *